(12) United States Patent
Park et al.

(10) Patent No.: US 9,470,415 B2
(45) Date of Patent: Oct. 18, 2016

(54) SUSPENDED COMBUSTION TYPE POWER STEAM GENERATOR

(71) Applicants: KOREA INSTITUTE OF ENERGY RESEARCH, Daejeon (KR); ES CO., LTD., Chungcheongbuk-do (KR)

(72) Inventors: Seong-Ryong Park, Daejeon (KR); Kyung-Soo Shin, Chungcheongbuk-do (KR)

(73) Assignees: Korea Institute of Energy Research, Daejeon (KR); ES CO., LTD., Cheongju-si, Chungcheongbuk-do (KR)

( * ) Notice: Subject to any disclaimer, the term of this patent is extended or adjusted under 35 U.S.C. 154(b) by 138 days.

(21) Appl. No.: 14/394,521

(22) PCT Filed: Dec. 26, 2012

(86) PCT No.: PCT/KR2012/011468
§ 371 (c)(1),
(2) Date: Oct. 15, 2014

(87) PCT Pub. No.: WO2013/157724
PCT Pub. Date: Oct. 24, 2013

(65) Prior Publication Data
US 2015/0059659 A1     Mar. 5, 2015

(30) Foreign Application Priority Data
Apr. 16, 2012  (KR) .................. 10-2012-0039118

(51) Int. Cl.
*F22B 21/08*     (2006.01)
*F22B 37/14*     (2006.01)
(Continued)

(52) U.S. Cl.
CPC ............. *F22B 37/141* (2013.01); *C10B 47/22* (2013.01); *C10B 53/00* (2013.01); *F22B 13/00* (2013.01); *F22B 21/04* (2013.01); *F22B 37/40* (2013.01); *F23G 5/46* (2013.01); *Y02E 20/12* (2013.01); *Y02P 20/133* (2015.11)

(58) Field of Classification Search
CPC ...... F22B 21/04; F22B 21/085; F22B 21/08; F22B 21/081; F22B 17/16; F22B 37/24; F22B 37/244

USPC .................................................. 122/4 D, 450
See application file for complete search history.

(56) References Cited

U.S. PATENT DOCUMENTS 1,927,095 A * 9/1933 Lucke ..................... F22B 29/02
                                                       122/235.15
2,045,914 A * 6/1936 Ikeda ....................... F22G 7/14
                                                       122/302

(Continued)

FOREIGN PATENT DOCUMENTS

JP          11-201443 A    7/1999
JP        2003-065508 A    3/2003

(Continued)

*Primary Examiner* — Gregory A Wilson
(74) *Attorney, Agent, or Firm* — Rabin & Berdo, P.C.

(57) ABSTRACT

There is provided a suspended combustion type power steam generator capable of rapid and high-temperature pyrolysis using FRDF for extending residence time of high-temperature gas, and particularly the present invention improves the heating conditions of fluid in an arch water pipe, a heating water pipe and a down pipe by extending the residence time of high-temperature gas inside a combustion chamber. The present invention is an improvement of a power steam generator using fine refuse derived fuel (FRDF) which is an alternative energy source, and a flameless combustion device using fossil fuel capable of structuring a new additional facility so as to address the possibility of irregular raw material supply in the ethyl alcohol fuel operation for new renewable energy, that is, FRDF. Therefore, fuel conversion operations can be carried out and a circulation path is partially restructured so as to prevent the interruption of the natural convection function of boiler water regardless of FRDF operation or fossil fuel operations. The existing power steam generator is commonly used in 0.5 tons class and has the problem of having a short residence time of high-temperature gas according to the heating conditions of fluid in a large capacity power steam generator of 5 tons or higher. The present invention extends the residence time of high-temperature gas in the combustion chamber by installing a baffle plate portion so as to sufficiently satisfy the heating condition of fluid as the result.

5 Claims, 4 Drawing Sheets

(51) Int. Cl.
  *F22B 13/00* (2006.01)
  *F22B 37/40* (2006.01)
  *F23G 5/46* (2006.01)
  *C10B 47/22* (2006.01)
  *F22B 21/04* (2006.01)
  *C10B 53/00* (2006.01)

(56) References Cited

U.S. PATENT DOCUMENTS 2,852,002 A * 9/1958 Sprague ................. F22B 21/08
  122/333
4,473,013 A * 9/1984 John ........................ F22B 1/18
  110/171
4,483,258 A * 11/1984 John ........................ F22B 1/18
  110/162
5,311,842 A    5/1994 Nagato et al.

FOREIGN PATENT DOCUMENTS

| KR | 20-1986-0012123 | 10/1986 |
| KR | 20-1990-0010377 | 6/1990 |
| KR | 10-1994-0002547 | 2/1994 |
| KR | 10-0412918 B1 | 12/2003 |
| KR | 10-2004-0021766 A | 3/2004 |
| KR | 10-0773383 B1 | 11/2007 |

* cited by examiner

SUSPENDED COMBUSTION TYPE POWER STEAM GENERATOR

TECHNICAL FIELD

The present invention relates to a suspended combustion type power steam generator capable of rapid and high-temperature pyrolysis using fine refuse derived fuel (FRDF) for extending residence time of high-temperature gas, which is an improvement of a flameless combustion device using fossil fuel applicable to structure a new additional facility and to comply with irregular raw material supply, and an improvement of a power steam generator applicable to an alternative energy source FRDF, so as to carry out fuel conversion operation and partially restructure a circulation path not to prevent the natural convection function of boiler water regardless of FRDF operation or fossil fuel operations.

BACKGROUND ART

Today, most countries worldwide face and have two big challenges of resources import-dependent economies and incineration disposal and recycling problems of large amounts of industrial waste and municipal waste. Particularly, the large amount of waste being discharged daily causes a number of problems such as conflict between districts and soil and water pollution due to landfill.

So, sludges generated from water and sewerage treatment process as well as separate collection and recycling of waste sewage left challenges of cleaning by carbonization process. Thus, many types of incineration facilities are produced and used. Most of the incineration facilities being utilized employ upright fired combustion system by chain grate stoker oxidation combustion or fixed grate combustion, which result in massive facilities in scale due to excess air ratio (2.0~2.5 or less) and also have thermodynamic limitation or combustion process limitation in low temperature primary air flow. Thus, they already have problems being insufficient to cope with the infrastructure equipment to future-oriented manufacturing industries.

The applicant of the present invention applied and got registration of Utility Model Registration No. 39593 [Application No. 85-2353](Title: high temperature decomposition arch-type carbonized hollow incinerator) and Utility Model Registration No. 56796 [Application No. 88-18826](Title: carbonized hollow-type continuous pyrolysis incinerator).

The registered previous technologies showed much lower air ratio of combustible waste high pyrolysis (1100° C. or less)(empirical capacity 11.53 t/hr) and two times or faster burning velocity than the fired oxidation of grate combustion system adopted by the conventional large-scale incinerator first introduced in 1990s and running, and received empirical evaluation of combustion technology by related organizations, but for the needs to develop as economical scale facilities in the future (capacity 9.0 Gcal/hr or above) and the inevitability to set up a system optimized model as main process for small scale energy kombinat facilities, it is necessary to comprehensively understand heat-related facility conditions of the Ministry of Commerce, Industry and Energy, or KS standards and further, the testing standards or related regulations of U.S. ASEM code, and thus, challenges were raised to develop a much safer energy source boiler as main process system equipment in energy plants facilities in order to reduce the environmentally negative and ineffective aspects of conventional facilities and update for more stable energy equipment.

Accordingly, the applicant of the present invention filed Patent Application No. 1992-001307 on Jul. 28, 1992 to solve the problems and received the registration.

According to Patent Application No. 1992-001307, the applicant installed a carbonized hollow-type pyrolysis incinerator under the boiler (water drum) to facilitate the natural convection function of boiler water in the previous registered Utility Model Registration No. 56796 to fully receive a large amount of high temperature gas heat generated from continuous mass disposal incineration.

Thus, the water tube boiler technology development with the function of high pyrolysis firing frame structure of energy sources technology as main process based on future renewable energy facilities is imperative and efforts of further improving the system based on the technology experiences of the past are continuous. Thus, it is meaningful to develop a combustion system applicable to continuously and additionally work to avoid productivity up and down of generated steam or plant operation stop (shop down) even in irregular supply of power source material, FRDF. The applicant of the present invention filed the application of 'FRDF rapid and pyrolysis suspended combustion power steam generator' of multi-purpose boiler technology and received registration Patent Registration No. 10-0773383 (Oct. 7, 2007).

However, such power steam generator is normally used in 0.5 tons, but shows problem of short residence time of high temperature gas according to fluid heating condition in large scale power steam generator of 5 tons or more. Therefore, the feature is required to extend the residence time of the high temperature gas in the combustion chamber and fully satisfy the heating condition of fluid.

DISCLOSURE

Technical Problem

Therefore, the present invention has been made to solve the above problems, and it is an aspect of the present invention to provide a suspended combustion type power steam generator capable of rapid and high-temperature pyrolysis using FRDF for extending residence time of high-temperature gas, by additionally disposing a baffle plate portion to prolong the residence time of the high temperature gas inside a combustion chamber, in order to more effectively use the heat energy and increase the efficiency of high temperature gas generated from FRDF.

Technical Solution

In accordance with the present invention, the above and other aspects can be accomplished by providing a suspended combustion type power steam generator capable of rapid and high-temperature pyrolysis using FRDF for extending residence time of high-temperature gas in the power steam generator including a hollow dry distillation high pyrolysis down combustion type water tube boiler configured such that a continuous inlet is formed on the top of a combustion chamber to continuously supply fine refuse derived fuel (FRDF) thereinto, and a continuous outlet is formed on the bottom of the combustion chamber to discharge combustion material, and a firebox first water pipe of a four pass is formed to connect a water drum and a steam drum. The suspended combustion type power steam generator is characterized such that an ignition burner initially ignites the FRDF supplied through the continuous inlet, a header circulator circulates the high temperature heat generated by the high pyrolysis of the FRDF, and a pyro combust includes the head circulator, a down pipe and an arch header, and the continuous outlet discharges combustion material flowed from the pyro combust. In addition, a horizontal left and right pipe wall header is connected to a pipe wall header circulator inside the water drum, and a front water wall header circulator is connected to the one end of the horizontal left and right pipe wall header and is extended upwardly, and an arch header pipe extended from the arch header is connected to the front pipe wall header connected to the front pipe wall header circulator. The power steam generator further comprise a number of refractory arch tubes upwardly obliquely extended from the arch header through the center of the combustion chamber, and connected to the steam drum with firebox first water pipes, and a suspended combustion chamber to increase the efficiency of the refractory arch in the upper center portion of the combustion chamber, and a baffle plate portion in the combustion chamber under the refractory arch to prolong the residence time of high temperature gas generated by the combustion of FRDF inside the combustion chamber and to promote fluid heating condition in the arch pipe, a heating pipe, and the down pipe.

Further, according to the present invention, the horizontal left and right pipe wall header is determined by pre-negotiation with mechanical designers of the steam generator of the present invention. The height of the refractory arch newly built is adjusted up and down according to the installation standards of the arch header such that its inclined portion is maintained and aligned in parallel with a predetermined interval. The installation level of the refractory arch tube is precisely related with the position of the arch header, and is precisely aligned in plural lines with smooth bending inside the center of the combustion chamber.

Further, the baffle plate portion comprises first baffle plates extending downwardly vertically from the upper portion of a pyro combust in the upper portion of the combustion chamber, and second baffle plates extending upwardly vertically from the lower portion of the combustion chamber, and the first baffle plates and the second baffle plates are provided with at least two or more, and disposed alternately with each other.

In addition, the additional built of the refractory arch of the present invention is made as lightweight design by specific order dimension and is recommended to made custom-built according to the directives of research designers.

Further, the present invention is characterized in that first baffle plate is extended vertically in a predetermined length from the top in the pyro combust, and second baffle plate is extended vertically in a predetermined length from the bottom in the combustion chamber.

Further, in the present invention, a supporting device may be needed inside the combustion chamber in order to maintain the generated heat temperature by quality standards of fuel supply material.

In addition, the refractory arch tube should be connected after precisely machining between the arch header and the steam drum such that plural lines of the refractory arch tubes are smoothly bent and vertically aligned in parallel between pipes of the refractory first pipe group and the upper bent portions are connected in same curved shapes with the other pipes.

Advantageous Effects

As described above, in accordance with the suspended combustion type power steam generator capable of rapid and high-temperature pyrolysis using FRDF for extending residence time of high-temperature gas of the present invention, the present invention can be employed in 5 tons or more of power steam generator because the residence time of high temperature gas inside the combustion chamber is extended and the fluid heating condition inside the arch pipe, the water pipe, and the down pipe is improved.

Further, according to the present invention, the front pipe wall header circulator is newly installed such that the water of the water drum passes through the existing down pipe and the left and right pipe wall header horizontally-modified, and vertically flows to the front pipe wall header newly-built, so that the natural convection function is restored and the power steam generator can be also run by using fossil fuel.

Further, high temperature gas moving toward the center of the combustion chamber from the arch header is made to contact at higher density around with the pipes group so as to increase the endothermic reaction. Further, the installation of tube drilling holes corresponding to the number of the refractory arch tubes can be omitted in the installation design of the generator.

DESCRIPTION OF DRAWINGS

These and other aspects and advantages of the present invention will become apparent and more readily appreciated from the following description of the embodiments, taken in conjunction with the accompanying drawings, in which.

BRIEF DESCRIPTION OF REFERENCE NUMBERS OF MAJOR ELEMENTS

Figure 1:
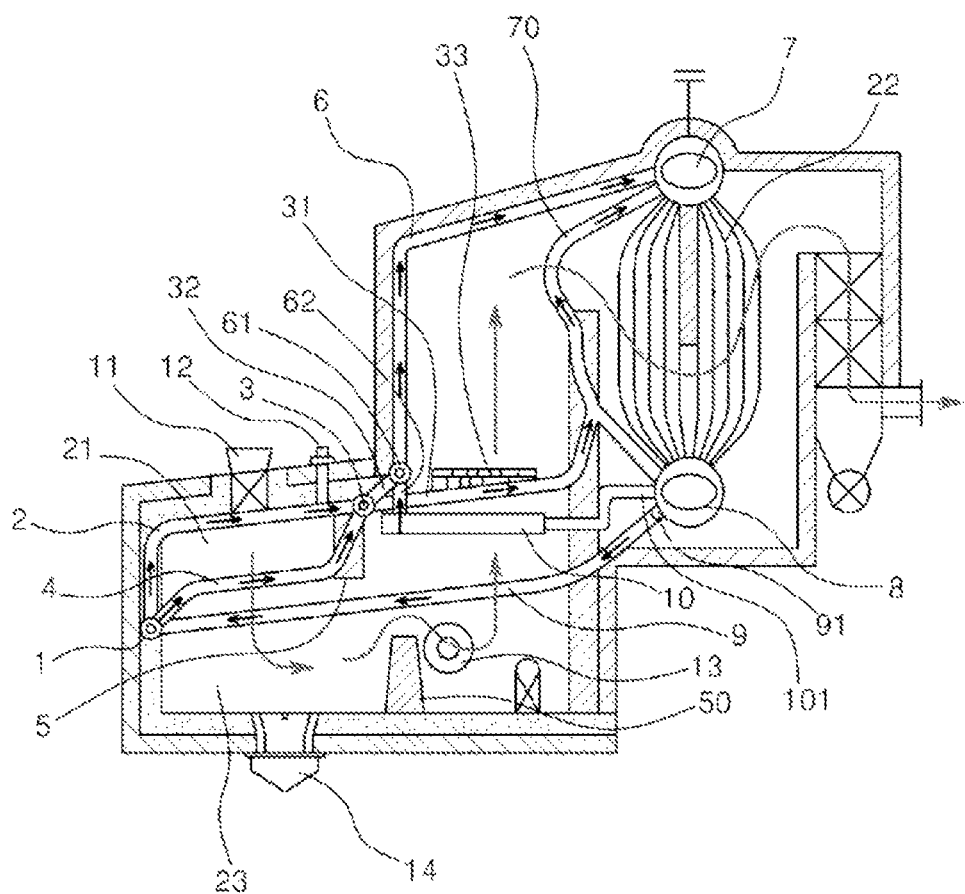
FIG. 1 is a sectional view of a conventional suspended combustion type power steam generator capable of rapid and high-temperature pyrolysis using FRDF.

| | |
|---|---|
| 1: header | 2: arch pipe |
| 3: arch header | 31: refractory arch tube |
| 32: arch header pipe | 33: refractory arch |
| 4: heating pipe | 5, 5a, 5b: first baffle plate |
| 51, 52, 53: second baffle plate | 50: baffle plate portion |
| 5', 5a', 5b', 51', 52', 53': baffle flange | |
| 6: front water evaporation rise pipe | 61: front wall header |
| 62: front water wall header circulator | 7: steam drum |
| 70: firebox first water pipe | 8: water drum   9: down pipe |
| 91: head circulator | 10: left and right pipe wall header |
| 101: left and right pipe wall header circulator | |
| 11: continuous inlet | 12: ignition burner |
| 13: supporting burner | 14: continuous outlet |
| 21: pyro combust | 22: water tube boiler |
| 23: suspended combustion chamber | |

Best Mode

The present invention to achieve the above aspects has the characteristics as follows:

In accordance with an embodiment of the present invention, there is a suspended combustion type power steam generator capable of rapid and high-temperature pyrolysis using FRDF for extending residence time of high-temperature gas, including a hollow dry distillation high pyrolysis down combustion type water tube boiler having a continuous inlet 11 on the top of a combustion chamber to continuously supply fine refuse derived fuel (FRDF) thereinto, and a continuous outlet 14 on the bottom of the combustion chamber to discharge combustion material, and a firebox first water pipe 70 of a four pass connecting a water drum 8 and a steam drum 7, and the suspended combustion type power steam generator further comprises a down pipe 9 connected to a header circulator 91 directly connected to the right and left outer side of the water drum 8, and downwardly inclined to be connected to a header 1; an arch header pipe 32 directly connected to an arch header 3 connecting an arch pipe 2 and a heating pipe 4 extended respectively from the upper side and the lower side of the header 1 and installed in opposite to each other, and extending upwardly; a front water wall header circulator 62 connected to the one end of a horizontal left and right pipe wall header 10 connected to a left and right pipe wall header circulator 101 directly connected to the left and right inner side of the water drum 8, and extending upwardly; a front water evaporation rise pipe 6 upwardly extended from a front wall header 61 connected to the arch header pipe 32 and the front water wall header circulator 62, and connected to the steam drum 7 of a water tube boiler 22 installed at the read side; a number of refractory arch tubes 31 upwardly obliquely extended from the arch header 3 through the center of the combustion chamber, and smoothly bending closer toward the steam drum 7 to be connected to the steam drum 7; a heat-storage refractory arch 33 on the upper side of the refractory arch tubes 31 at the center of the combustion chamber to further maximize the endothermic reaction effect; and a baffle plate portion 50 in the combustion chamber under the refractory arch 33 to prolong the residence time of high temperature gas generated by the combustion of FRDF inside the combustion chamber and to promote fluid heating condition in the arch pipe 2, a heating pipe 4, and the down pipe 9.

Mode For Invention

The present invention will now be described more fully hereinafter with reference to the accompanying drawings, in which preferred embodiments of the invention are shown.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As used herein, the singular forms "a", "an" and "the" are intended to include the plural forms as well, unless the context clearly indicates otherwise.

The present invention may be embodied in different forms and should not be construed as limited to the embodiments set forth herein. Rather, these embodiments are provided as teaching examples of the invention. Therefore, it will be understood that the scope of the invention is intended to include various modifications and alternative arrangements within the capabilities of persons skilled in the art using presently known or future technologies and equivalents.

Figure 2:
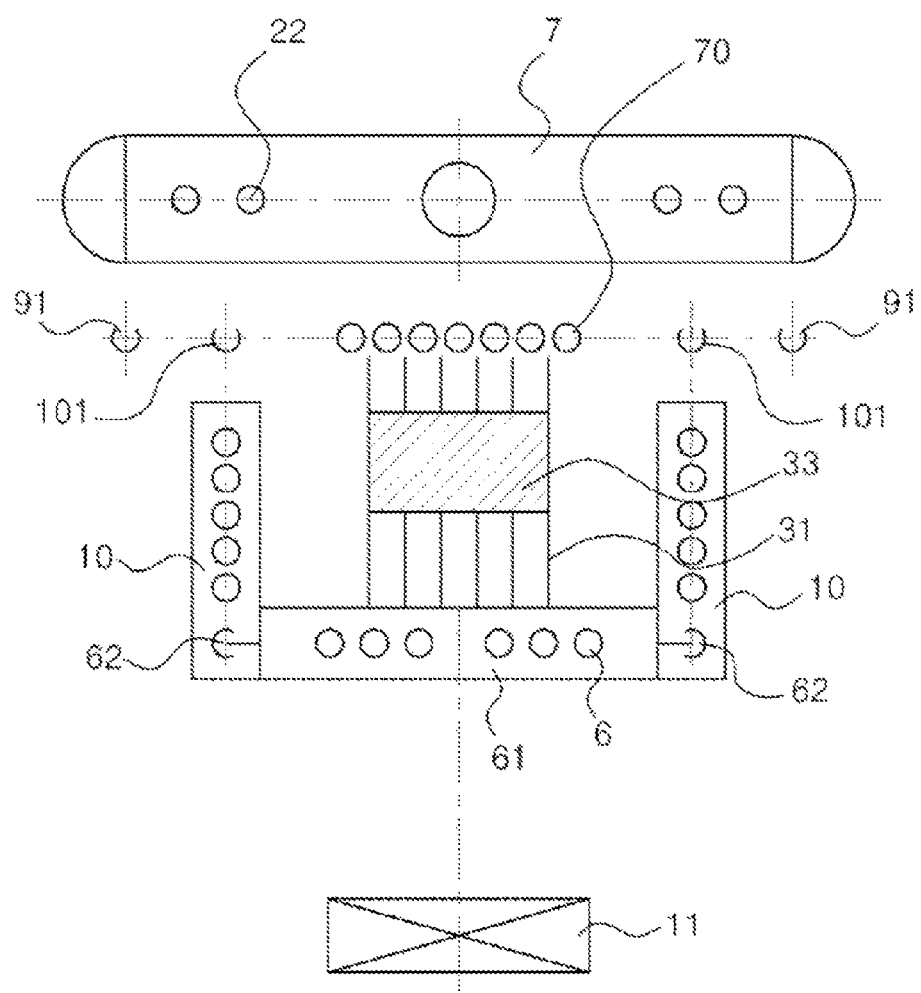
FIG. 2 is a plan view of the conventional suspended combustion type power steam generator capable of rapid and high-temperature pyrolysis using FRDF.

FIG. 1 is a sectional view of a conventional suspended combustion type power steam generator capable of rapid and high-temperature pyrolysis using FRDF, and FIG. 2 is a plan view of the conventional suspended combustion type power steam generator capable of rapid and high-temperature pyrolysis using FRDF.

The conventional suspended combustion type power steam generator capable of rapid and high-temperature pyrolysis using FRDF is to improve the registered Patent Registration No. 103232 (Title: hollow type dry distillation high pyrolysis combustion down water tube boiler) of the previous art by the present applicant, and the Patent Registration includes a firebox first water pipe 70 of a four pass connecting a water drum 8 and a steam drum 7.

The conventional suspended combustion type power steam generator capable of rapid and high-temperature pyrolysis using FRDF is designed to run also by fossil fuel (oil, city gas, etc.) with compatibility in the prior art of the Patent Registration using FRDF as main material source, not to be interrupted by steam loading up and down because of supply condition or quality standards of FRDF. In addition, the conventional suspended combustion type power steam generator capable of rapid and high-temperature pyrolysis using FRDF is made to prevent the resistance of the circulation function of boiler water regardless of FRDF use-only operation or fossil fuel use-only operation, and to prevent the interruption in natural convection function of boiler water by improving the circulation path.

The present invention is to improve and address the problem that the conventional power steam generator is only used in the class of 0.5 tons, but the residence time of high-temperature gas is short according to the heating condition in the large scale power steam generator of 5 tons or more.

Figure 3:
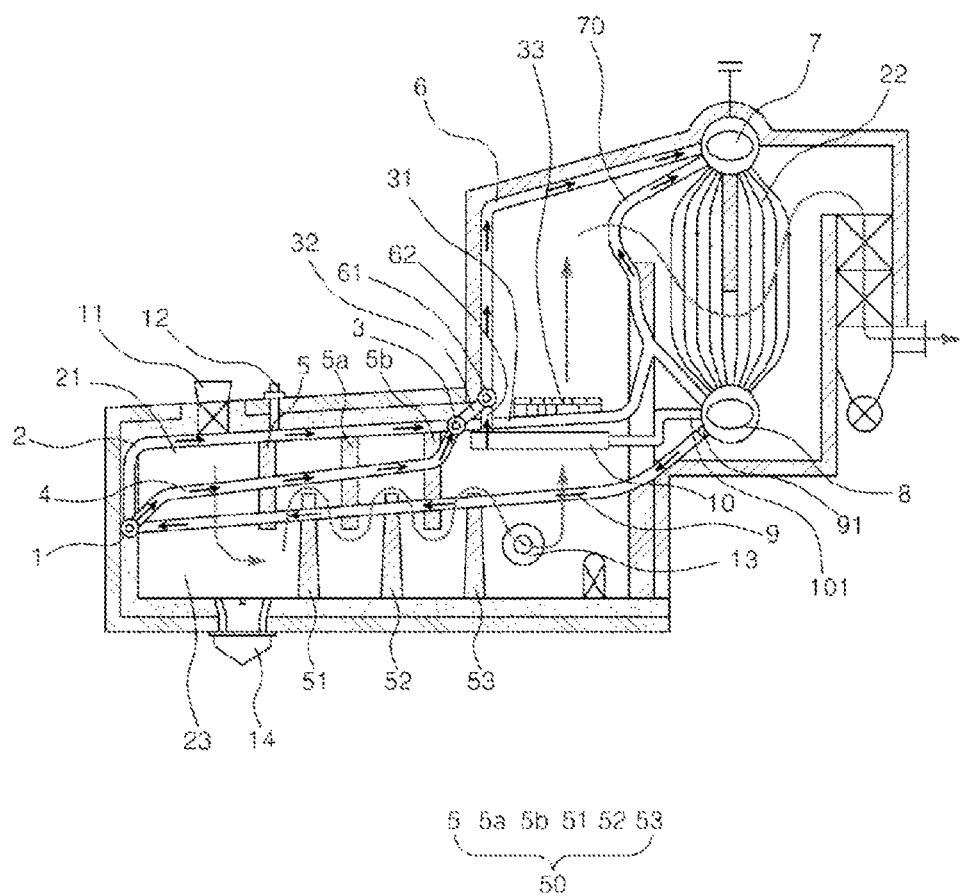
FIG. 3 is a sectional view of a suspended combustion type power steam generator capable of rapid and high-temperature pyrolysis using FRDF for extending residence time of high-temperature gas according to one embodiment of the present invention.

FIG. 3 is a sectional view of a suspended combustion type power steam generator capable of rapid and high-temperature pyrolysis using FRDF for extending residence time of high-temperature gas according to one embodiment of the present invention.

As illustrated in FIG. 3, the power steam generator of the present invention comprises a down pipe 9 connected with a head circulator 91 directly connected with the left and right sides of a water drum 8 and downwardly inclined to be connected to a header 1; an arch header pipe 32 directly connected to an arch header 3 connecting an arch pipe 2 and a heating pipe 4 extended respectively from the upper side and the lower side of the header 1 and installed in opposite to each other, and extending upwardly; a front water wall header circulator 62 connected to the one end of a horizontal left and right pipe wall header 10 connected to a left and right pipe wall header circulator 101 directly connected to the left and right inner side of the water drum 8, and extending upwardly; a front water evaporation rise pipe 6 upwardly extended from a front wall header 61 connected to the arch header pipe 32 and the front water wall header circulator 62, and connected to the steam drum 7 of a water tube boiler 22 installed at the read side; a number of refractory arch tubes 31 upwardly obliquely extended from the arch header 3 through the center of the combustion chamber, and smoothly bending closer toward the steam drum 7 to be connected to the steam drum 7; a heat-storage refractory arch 33 on the upper side of the refractory arch tubes 31 at the center of the combustion chamber to further maximize the endothermic reaction effect; and a baffle plate portion 50 in the combustion chamber under the refractory arch 33 to prolong the residence time of high temperature gas generated by the combustion of FRDF inside the combustion chamber and to promote fluid heating condition in the arch pipe 2, a heating pipe 4, and the down pipe 9.

Further, the baffle plate portion 50 comprises first baffle plates 5, 5a, 5b extending downwardly vertically from the upper portion of a pyro combust 21 in the upper portion of the combustion chamber, and second baffle plates 51, 52, 53 extending upwardly vertically from the lower portion of the combustion chamber, and the first baffle plates and the second baffle plates provided with at least two or more, and disposed alternately with each other as illustrated in FIG. 3. The configuration as above gives changes in the movement direction of the high temperature gas so as to increase the density of pyro and high temperature gas and thereby to improve the values of energy efficiency. Further, the function of the refractory arch 33 above the refractory arch tubes 31 can be more effectively exerted to achieve the more efficient endothermic reaction by the high temperature gas which spreads at faster speed all directions from the center of the suspended combustion chamber 23 and circulates round in contact with each of the pipe groups (refractory arch tube, front wall header, and water header circulator), and also pyro concentration phenomenon.

Figure 4:
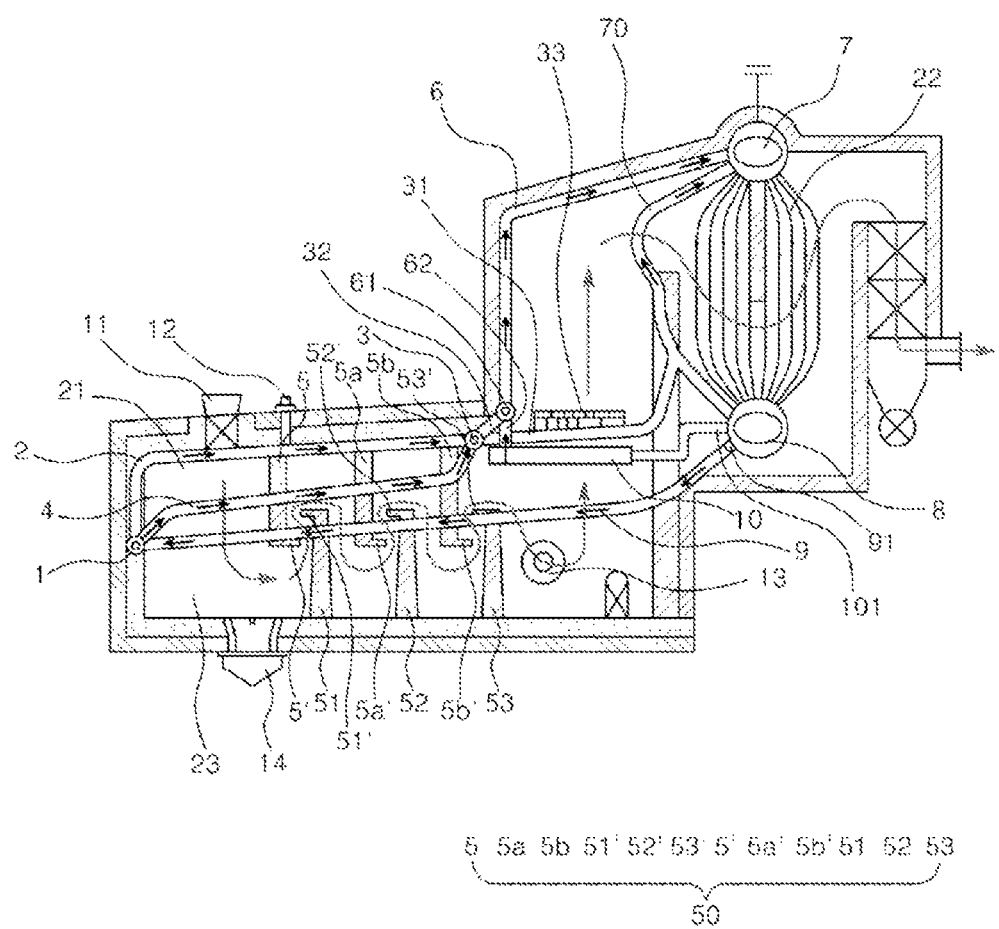
FIG. 4 is a sectional view of a suspended combustion type power steam generator capable of rapid and high-temperature pyrolysis using FRDF for extending residence time of high-temperature gas according to another embodiment of the present invention.

The baffle plate portion 50 may further comprise baffle flanges 5',5a',5b',51',52', and 53' at the ends of the first baffle plates 5,5a, and 5b and the second baffle plates 51, 52, and 53. As illustrated in FIG. 4, the flow of the high temperature gas can be more interrupted so as to enhance the efficiency of the function as described above.

Further, the left and right water wall header 10 is horizontally redesigned to level up different from the inclined shape inside the conventional water tube boiler (Patent Registration No. 103232), and configured such that one end is connected to the left and right pipe wall header circulator 101, and the other end is connected to the front water wall header circulator 62.

The front water wall header circulator 62 is vertically connected from one end of the left and right water wall header 10, and connected to the front wall header 61.

Further, the upper portion of the front wall header 61 is connected with the front water evaporation rise pipe 6.

The refractory arch and the arch line from the arch header 3 are configured with two lines in order to produce superheat or saturated steam from the steam drum 7. One of them is the arch header pipe 32 connected with the front wall header 61, and one of them is a number of refractory arch tubes 31 connected in parallel with a number of firebox first water pipes 70.

The refractory arch tubes 31 are made to be connected to the steam drum 7 from the arch header 3 after precisely designing and vertically aligned in parallel between each of the firebox first water pipes 70, and the upper portion of each tube 31 is designed to be bent in same with the curved portion of the other pipes which connected to the steam drum 7.

The refractory arch 33 by the on-site built construction is installed above the refractory arch tubes 31, and should be installed by using particularly custom-built refractory lightweight material by the cooperation of construction directors. An example of the refractory arch 33 may be refractory firebrick or refractory rebar member.

In addition, when the refractory arch tubes 31 are installed, tube drilling holes of the firebox first water pipes 70 as many as of the number of the refractory arch tubes 31 is decreased can be omitted in the design of the water drum 8.

Further, according to the present invention, it is possible to drive a comprehensive governing system for industry energy power source as power steam generator for basic control function of governor controller by the combustion chamber PS or TS system or package control valve and so on for the operation at safe temperature ranges (1100° C. or less) to be exerted as stable suspended combustion function.

A supporting burner 13 is disposed at the lower portion of the suspended combustion chamber 23 and is configured to automatically operate within the inner predetermined temperature ranges of the suspended combustion chamber 23.

Further, the present invention comprises a horizontal left and right pipe wall header 10 connected through a wall header circulator 101 directly connected to the left and right inner side of the water drum 8, a front water wall header circulator 62 connected to the one end of the horizontal left and right pipe wall header 10 and vertically upwardly extended, a front wall header 61 connected to one side of the front water wall header circulator 62, an arch header pipe 32 extended from an arch header 3 connected to the front wall header 61, a number of refractory arch tubes 31 extended from the arch header 3 and through the combustion chamber and connected to the steam drum 7 with the firebox first water pipes 70, and a suspended combustion chamber 23 for increase of the function of the refractory arch 33 disposed above the refractory arch tubes 31, and can be driven by the operation of fossil fuel only.

While the invention was described above with reference to the finite embodiments and drawings, the invention is not limited to the embodiments but can be modified and changed in various forms by those skilled in the art without departing from the technical concept of the invention and the equivalents of the appended claims.

What is claimed is:

1. A suspended combustion type power steam generator, comprising:
    a continuous inlet disposed on a top of a combustion chamber to continuously supply fine refuse derived fuel (FRDF);
    a continuous outlet disposed on a bottom of the combustion chamber to discharge combustion material;
    a hollow dry distillation high pyrolysis down combustion type water tube boiler having a firebox first water pipe connecting a water drum and a steam drum;
    a down pipe connected to a header circulator directly connected to the water drum, and downwardly inclined to be connected to a header;
    an arch header pipe directly connected to an arch header connecting an arch pipe and a heating pipe extended respectively from the header and installed in opposite to each other, and extending upwardly;
    a front water wall header circulator connected to a first end of a horizontal left and right pipe wall header connected to a left and right pipe wall header circulator directly connected to the water drum, and extending upwardly;
    a front water evaporation rise pipe upwardly extended from a front wall header connected to the arch header pipe and the front water wall header circulator, and connected to the steam drum of a water tube boiler;
    a number of refractory arch tubes upwardly obliquely extended from the arch header through a center of the combustion chamber, and smoothly bending closer toward the steam drum to be connected to the steam drum;

a heat-storage refractory arch on an upper side of the refractory arch tubes at the center of the combustion chamber to further maximize the endothermic reaction effect; and a baffle plate portion disposed in the combustion chamber under the refractory arch to prolong a residence time of high temperature gas generated by the combustion of FRDF and to promote a heating condition of a fluid in the arch pipe, the heating pipe, and the down pipe, wherein the baffle plate portion comprises at least two or more first baffle plates extending downwardly from an upper portion of a pyro combust disposed in an upper portion of the combustion chamber, and at least two or more second baffle plates extending upwardly from a lower portion of the combustion chamber, and wherein the first baffle plates and the second baffle plates are disposed alternately with each other such that a lower end portion of each of the first baffle plates and an upper end portion of each of the second baffle plates are overlapped with each other.

2. The suspended combustion type power steam generator according to claim 1, wherein the refractory arch tube is upwardly inclined to the center of the combustion chamber, and connected to the steam drum.

3. The suspended combustion type power steam generator according to claim 1, wherein the lower end portion of each of the first baffle plates has a first baffle flange protruding to a lateral side of said each of the first baffle plates, the upper end portion of each of the second baffle plates has a second baffle flange protruding to a lateral side of said each of the second baffle plates, and the first baffle flange of the first baffle flange is opposite to a corresponding second baffle flange of the second baffle flange.

4. A suspended combustion type power steam generator, comprising:

a continuous inlet disposed on a top of a combustion chamber to continuously supply fine refuse derived fuel (FRDF);

a continuous outlet disposed on a bottom of the combustion chamber to discharge combustion material;

a hollow dry distillation high pyrolysis down combustion type water tube boiler having a firebox first water pipe connecting a water drum and a steam drum;

a down pipe connected to a header circulator directly connected to the water drum, and downwardly inclined to be connected to a header;

an arch header pipe directly connected to an arch header connecting an arch pipe and a heating pipe extended respectively from the header and installed in opposite to each other, and extending upwardly;

a front water wall header circulator connected to a first end of a horizontal left and right pipe wall header connected to a left and right pipe wall header circulator directly connected to the water drum, and extending upwardly;

a front water evaporation rise pipe upwardly extended from a front wall header connected to the arch header pipe and the front water wall header circulator, and connected to the steam drum of a water tube boiler;

a number of refractory arch tubes upwardly obliquely extended from the arch header through a center of the combustion chamber, and smoothly bending closer toward the steam drum to be connected to the steam drum;

a heat-storage refractory arch on an upper side of the refractory arch tubes at the center of the combustion chamber to further maximize the endothermic reaction effect; and a baffle plate portion disposed in the combustion chamber under the refractory arch to prolong a residence time of high temperature gas generated by the combustion of FRDF and to promote a heating condition of a fluid in the arch pipe, the heating pipe, and the down pipe, wherein the baffle plate portion comprises at least two or more first baffle plates extending downwardly from an upper portion of a pyro combust disposed in an upper portion of the combustion chamber, and at least two or more second baffle plates extending upwardly from a lower portion of the combustion chamber, and wherein the first baffle plates and the second baffle plates are disposed alternately with each other, a lower end portion of each of the first baffle plates has a first baffle flange protruding to a lateral side of said each of the first baffle plates, an upper end portion of each of the second baffle plates has a second baffle flange protruding to a lateral side of said each of the second baffle plates, and the first baffle flange of the first baffle flange is opposite to a corresponding second baffle flange of the second baffle flange.

5. The suspended combustion type power steam generator according to claim 4, wherein the refractory arch tube is upwardly inclined to the center of the combustion chamber, and connected to the steam drum.

* * * * *